(12) United States Patent
Arora et al.

(10) Patent No.: US 9,851,777 B2
(45) Date of Patent: Dec. 26, 2017

(54) POWER GATING BASED ON CACHE DIRTINESS

(71) Applicant: Advanced Micro Devices, Inc., Sunnyvale, CA (US)

(72) Inventors: Manish Arora, Dublin, CA (US); Indrani Paul, Round Rock, TX (US); Yasuko Eckert, Kirkland, WA (US); Nuwan S. Jayasena, Sunnyvale, CA (US); Srilatha Manne, Portland, OR (US); Madhu Saravana Sibi Govindan, Austin, TX (US); William L. Bircher, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 691 days.

(21) Appl. No.: 14/146,591

(22) Filed: Jan. 2, 2014

(65) Prior Publication Data

US 2015/0185801 A1 Jul. 2, 2015

(51) Int. Cl.
G06F 1/32 (2006.01)

(52) U.S. Cl.
CPC .......... *G06F 1/3287* (2013.01); *G06F 1/3225* (2013.01); *Y02B 60/1282* (2013.01); *Y02B 60/32* (2013.01)

(58) Field of Classification Search
CPC . G06F 1/3287; G06F 1/3225; Y02B 60/1282; Y02B 60/32
See application file for complete search history.

(56) References Cited

U.S. PATENT DOCUMENTS

| 5,758,143 | A  | 5/1998  | Levitan       |
| 6,457,134 | B1 | 9/2002  | Lemke et al.  |
| 7,143,273 | B2 | 11/2006 | Miller        |
| 7,266,707 | B2 | 9/2007  | Ngo           |
| 7,490,302 | B1 | 2/2009  | Rahman        |
| 7,868,479 | B2 | 1/2011  | Subramaniam   |
| 8,245,065 | B2 | 8/2012  | Niggemeier    |
| 8,949,554 | B2 | 2/2015  | Sadowski et al. |
| 9,176,572 | B2 | 11/2015 | Thomson       |

(Continued)

FOREIGN PATENT DOCUMENTS

EP 2017354 3/2011

OTHER PUBLICATIONS

2nd Generation Intel Core Processor Family Desktop: Datasheet, vol. 1, Supporting Intel Core i7, i5 and i3 Desktop Processor Series, Intel, Sep. 2012, 112 pages.

(Continued)

*Primary Examiner* — Thomas Lee
*Assistant Examiner* — Vincent Chang

(57) ABSTRACT

Power gating decisions can be made based on measures of cache dirtiness. Analyzer logic can selectively power gate a component of a processor system based on a cache dirtiness of one or more caches associated with the component. The analyzer logic may power gate the component when the cache dirtiness exceeds a threshold and may maintains the component in an idle state when the cache dirtiness does not exceed the threshold. Idle time prediction logic may be used to predict a duration of an idle time of the component. The analyzer logic may then selectively power gates the component based on the cache dirtiness and the predicted idle time.

22 Claims, 10 Drawing Sheets

(56) References Cited

U.S. PATENT DOCUMENTS

| | | | |
|---|---|---|---|
| 9,183,144 B2 | 11/2015 | Wang | |
| 2003/0093653 A1 | 5/2003 | Oga | |
| 2006/0184287 A1 | 8/2006 | Belady | |
| 2006/0248436 A1 | 11/2006 | Le-France-Linden et al. | |
| 2007/0288414 A1 | 12/2007 | Barajas | |
| 2008/0209243 A1 | 8/2008 | Ghiasi et al. | |
| 2008/0276238 A1 | 11/2008 | Levanoni et al. | |
| 2009/0150696 A1 | 6/2009 | Song | |
| 2009/0158067 A1 | 6/2009 | Bodas et al. | |
| 2009/0235105 A1 | 9/2009 | Branover et al. | |
| 2010/0058078 A1 | 3/2010 | Branover et al. | |
| 2010/0107174 A1 | 4/2010 | Suzuki et al. | |
| 2010/0138456 A1 | 6/2010 | Aghili | |
| 2010/0145896 A1 | 6/2010 | Yuta | |
| 2010/0169683 A1 | 7/2010 | Wang et al. | |
| 2010/0287394 A1 | 11/2010 | Branover et al. | |
| 2011/0040995 A1 | 2/2011 | Basak et al. | |
| 2011/0078478 A1 | 3/2011 | Branover et al. | |
| 2011/0153536 A1 | 6/2011 | Yang | |
| 2011/0161627 A1 | 6/2011 | Song et al. | |
| 2011/0291748 A1 | 12/2011 | Li et al. | |
| 2012/0173907 A1 | 7/2012 | Moses et al. | |
| 2013/0007494 A1 | 1/2013 | Branover et al. | |
| 2013/0080813 A1* | 3/2013 | Tarui | G06F 1/3275 713/324 |
| 2013/0097415 A1 | 4/2013 | Li et al. | |
| 2013/0097443 A1 | 4/2013 | Li et al. | |
| 2013/0185570 A1 | 7/2013 | Kumar et al. | |
| 2013/0238628 A1 | 9/2013 | Behnen et al. | |
| 2014/0006817 A1 | 1/2014 | Bonen | |
| 2014/0058738 A1 | 2/2014 | Yeskel | |
| 2014/0086406 A1* | 3/2014 | Polzin | G09C 1/00 380/44 |
| 2014/0089697 A1 | 3/2014 | Kim | |
| 2014/0095896 A1* | 4/2014 | Carter | G06F 1/26 713/300 |
| 2014/0149772 A1 | 5/2014 | Arora et al. | |
| 2014/0173206 A1 | 6/2014 | Wang et al. | |
| 2014/0181553 A1 | 6/2014 | Eckert et al. | |
| 2014/0181556 A1 | 6/2014 | Eckert et al. | |
| 2014/0380072 A1 | 12/2014 | Lee | |
| 2015/0067357 A1 | 3/2015 | Arora | |
| 2015/0067700 A1 | 3/2015 | Kim et al. | |
| 2015/0100810 A1 | 4/2015 | Sreekumaran et al. | |
| 2015/0170048 A1 | 6/2015 | Lin | |
| 2015/0170049 A1 | 6/2015 | Mann | |
| 2015/0198991 A1 | 7/2015 | Bircher | |

OTHER PUBLICATIONS

Non-Final Office Action dated Sep. 11, 2015 for U.S. Appl. No. 14/152,826, 28 pages.
International Search Report and Written Opinion in International Application No. PCT/US2013/075311, dated Apr. 23, 2014, 12 pages.
Non-Final Office Action dated Jul. 14, 2015 for U.S. Appl. No. 14/015,578, 27 pages.
U.S. Appl. No. 14/488,874, filed Sep. 17, 2014, listing Fulya Kaplan, et al. as inventors, entitled "Predictive Management of Heterogeneous Processing Systems".
Final Office Action dated Dec. 14, 2015 for U.S. Appl. No. 14/015,578, 20 pages.
Canturk ISCI et al., "Live, Runtime Phase Monitoring and Prediction on Real Systems with Application to Dynamic Power Management", Micro-39. 39th Annual IEEE/ACM International Symposium on Microarchitecture, Oct. 9, 2006, 12 pages.
William Lloyd Bircher et al., "Predictive Power Management for Multi-Core Processors", Weed 2010—Workshop on Energy-Efficient Design, Jun. 1, 2010, 7 pages.
Yuki Abe et al., "Power and Performance Analysis of GPU-Accelerated Systems", Usenix, HotPower'12, 2012, 6 pages.
Non-Final Office Action dated Oct. 16, 2015 for U.S. Appl. No. 14/488,874, 21 pages.
Ravi Kokku, et al., "Adaptive Processor Allocation in Packet Processing Systems", 2004, 14 pages.
U.S. Appl. No. 13/723,868, filed Dec. 21, 2012, entitled "Idle Phase Prediction for Integrated Circuits".
Final Office Action dated Mar. 3, 2016 for US. Appl. No. 14/152,826, 18 pages.
U.S. Appl. No. 14/152,826, filed Jan. 10, 2014, entitled "Predicting Power Management State Durations on a Per-Process Basis".
U.S. Appl. No. 14/310,908, filed Jun. 20, 2014, entitled "Decoupled Entry and Exit Prediction for Power Gating".
Advanced Micro Devices, Inc., "BIOS and Kernel Developer's Guide (BKDG) for AMD Family 15h Models 00h-0Fh Processors", Jan. 2013.
Hu et al., "Microarchitectural Techniques for Power Gating of Execution Units", Proceedings of International Symposium on Low Power Electronics and Design, Aug. 2004.
U.S. Appl. No. 61/730,614, filed Nov. 28, 2012, entitled "Linear Prediction Based on Power Gating Entry Decisions".
U.S. Appl. No. 14/063,194, filed Dec. 25, 2013, entitled "Global History Pattern Based Power Gating Entry Decisions".
U.S. Appl. No. 14/015,578, filed Aug. 30, 2013, entitled "Prediction for Power Gating".
U.S. Appl. No. 14/146,588, filed Jan. 2, 2014, entitled "Configuring Processor Policies Based on Predicted Durations of Active Performance States".
U.S. Appl. No. 14/146,591, filed Jan. 2, 2014, entitled "Power Gating Based on Cache Dirtiness".
Non-Final Office Action dated Jun. 10, 2016 for U.S. Appl. No. 14/146,588, 49 pages.
Non-Final Office Action dated Jul. 14, 2016 for U.S. Appl. No. 14/152,826, 28 pages.
Non-Final Office Action dated Jul. 15, 2016 for U.S. Appl. No. 14/015,578, 19 pages.
Notice of Allowance dated Jul. 26, 2106 for U.S. Appl. No. 14/310,908, 18 pages.
Final Office Action dated May 26, 2016, for U.S. Appl. No. 14/015,578 14 pages.
Final Office Action dated May 18, 2016, for U.S. Appl. No. 14/488,874 30 pages.
Final Office Action dated Mar. 3, 2016 for U.S. Appl. No. 14/152,826, 18 pages.
Non-Final Office Action dated Mar. 30, 2016 for U.S. Appl. No. 14/310,908, 37 pages.
Non-Final Office Action dated Oct. 6, 2016 for U.S. Appl. No. 14/488,874, 24 pages.
Notice of Allowance dated Dec. 14, 2016 for U.S. Appl. No. 14/152,826, 53 pages.
Final Office Action dated Dec. 14, 2016 for U.S. Appl. No. 14/146,588, 29 pages.
Final Office Action dated May 18, 2017 for U.S. Appl. No. 14/488,874, 32 pages.
Notice of Allowance dated Apr. 10, 2017 for U.S. Appl. No. 14/152,826, 14 pages.

* cited by examiner

POWER GATING BASED ON CACHE DIRTINESS

BACKGROUND

Field of the Disclosure

The present disclosure relates generally to processor systems and, more particularly, to power gating components of processor systems.

Description of the Related Art

Processing devices such as central processing units (CPUs), graphics processing units (GPUs), accelerated processing units (APUs), or individual processor cores can operate in different performance states. Such performance states include active states in which the processing device is performing tasks, idle states in which the processing device is not performing tasks, and power-gated states in which power is not being supplied to the processing device. Components in the processing devices can conserve power by idling when there are no instructions to be executed by the component of the processing device. If the component is idle for a relatively long time, power supplied to the processing device may be gated so that little or no current is supplied to the component, thereby reducing stand-by and leakage power consumption. For example, a processor core in a CPU can be power gated if the processor core has been idle for more than a predetermined time interval. However, power gating consumes system resources. For example, power gating requires flushing caches in the processor core, which consumes both time and power. Power gating also exacts a performance cost to return the processor core to an active state. The idle time interval that elapses before power gating a component of a processing device may therefore be set to a relatively long time.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF EMBODIMENT(S)

As described herein, power management techniques that change the power management state of a component of a processing device can consume a large amount of system resources relative to the resources conserved by the state change. For example, an idle processor core in a CPU may be power gated (i.e., the state of the processor core may be changed from an idle power management state to a power gated power management state) just before the processor core needs to reenter the active state, which may lead to unnecessary delays and waste of the power needed to flush the caches associated with the processor core and return the processor core to the active state. For another example, if the processor core is not going to be used for a relatively long time, the processor core may remain in the idle state for too long before entering the power-gated state, thereby wasting the resources that could have been conserved by entering the power-gated state earlier.

Cache lines that have been modified may be marked as "dirty" until the modified cache lines have been written back to a higher level cache or main memory. The dirty cache lines are written back to the higher level cache or main memory before power-gating the corresponding processor cores. Since the amount of system resources required to write back the dirty lines in a cache increases as the number of dirty lines increases, the processing system can make a more accurate assessment of the potential costs and benefits of power-gating a component of a processing device by basing the decision to power-gate the component, at least in part, on the number or fraction of dirty cache lines in one or more associated caches. The number or fraction of dirty cache lines may also be referred to as the "dirtiness" of the cache.

FIGS. 1-9 describe embodiments of a performance policy manager that selectively power gates a component of a processing device based on a measure of the dirtiness of one or more caches associated with the component. Exemplary measures of the dirtiness of a cache include a performance counter that indicates a number of dirty cache lines, values of performance counters that track a number of cache lines whose status changes from states such as "read-only" or "exclusive" to states such as "dirty" or "modified," one or more bits that indicate whether any of the cache lines in a group or sector of cache lines is dirty, or information indicating a number of opcodes that could potentially make a cache line dirty. Some embodiments of the performance policy manager may also include an idle state duration predictor that can predict a duration of an idle state of the component. The performance policy manager may then use the predicted duration of the idle state in combination with the measure of dirtiness of the cache(s) to decide whether to power-gate the component.

Figure 1:
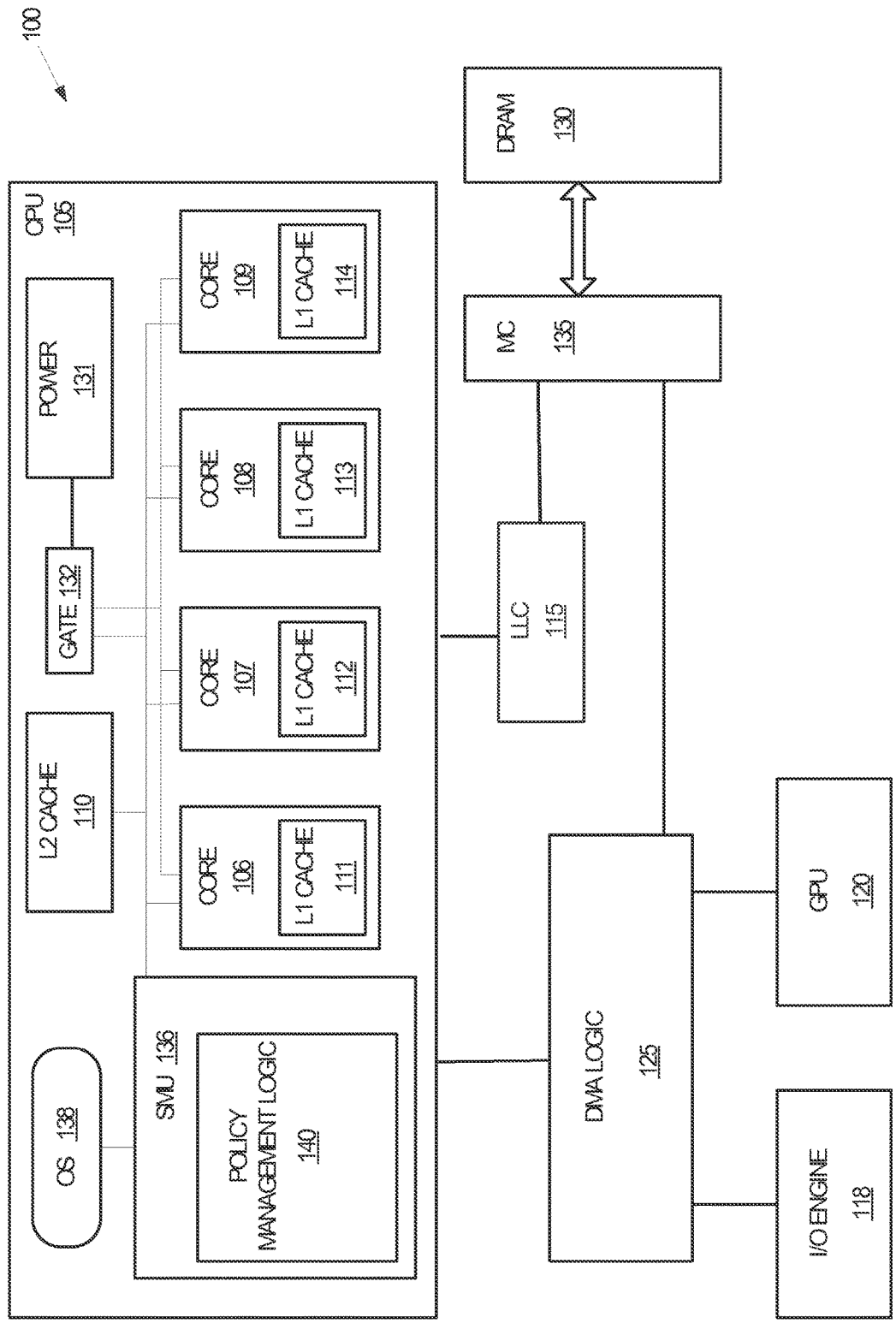
FIG. 1 is a block diagram of a processing system in accordance with some embodiments.

FIG. 1 is a block diagram of a processing system 100 in accordance with some embodiments. The processing system 100 includes a central processing unit (CPU) 105 for executing instructions. Some embodiments of the CPU 105 include multiple processor cores 106, 107, 108, 109 (referred to collectively as the "processor cores 106-109") that can independently execute instructions concurrently or in parallel. The CPU 105 shown in FIG. 1 includes four processor cores 106-109. However, persons of ordinary skill in the art having benefit of the present disclosure should appreciate that the number of processor cores in the CPU 105 is a matter of design choice. Some embodiments of the CPU 105 may include more or fewer than the four processor cores 106-109 shown in FIG. 1. Some embodiments of the processing system 100 may be formed on a single substrate, e.g., as a system-on-a-chip (SOC).

The CPU 105 implements caching of data and instructions and some embodiments of the CPU 105 may therefore implement a hierarchical cache system. For example, the CPU 105 may include an L2 cache 110 for caching instructions or data that may be accessed by one or more of the processor cores 106-109. Each of the processor cores 106-109 may also be associated with one of a plurality of L1 caches 111, 112, 113, 114 (collectively referred to as the "L1 caches 111-114"). Some embodiments of the L1 caches 111-114 may be subdivided into an instruction cache and a data cache. Some embodiments of the hierarchical cache system include additional cache levels. For example, the processing system 100 may include a last level cache (LLC) 115 that is associated with the L2 cache 110 and the L1 caches 111-114. The LLC 115 may be an L3 cache, an L4 cache, or other cache depending on the number of levels in the cache hierarchy. Some embodiments of the LLC 115 may be implemented in a separate power plane from the CPU 105 and the LLC 115 may therefore be power gated independently of the CPU 105 or entities that are part of the CPU 105. Some embodiments of the L2 cache 110, the L1 caches 111-114, or the LLC 115 may be configured as writeback caches so that data is initially written to the cache and the modified cache line is marked as "dirty," e.g., by setting a dirty bit associated with the cache line. Dirty cache lines may subsequently be written back to a backing store such as a higher-level cache or a memory.

The processing system 100 includes an input/output engine 118 for handling input or output operations associated with elements of the processing system such as keyboards, mice, printers, external disks, and the like. A graphics processing unit (GPU) 120 is also included in the processing system 100 for creating visual images intended for output to a display. Some embodiments of the GPU 120 may include components such as multiple processor cores and/or other components such as cache elements that are not shown in FIG. 1 interest of clarity.

The processing system 100 shown in FIG. 1 also includes direct memory access (DMA) logic 125 for generating addresses and initiating memory read or write cycles. The CPU 105 may initiate transfers between memory elements in the processing system 100 such as the DRAM memory 130 or other entities connected to the DMA logic 125 including the CPU 105, the LLC 115, the I/O engine 118, or the GPU 120. Some embodiments of the DMA logic 125 may also be used for memory-to-memory data transfer or transferring data between the cores 106-109. The CPU 105 can perform other operations concurrently with the data transfers being performed by the DMA logic 125, which may provide an interrupt to the CPU 105 to indicate that the transfer is complete. A memory controller (MC) 135 may be used to coordinate the flow of data between the DMA logic 125, the LLC 115, and the DRAM 130. The memory controller 135 includes logic used to control reading information from the DRAM 130 and writing information to the DRAM 130. Some embodiments of the DRAM 130 may serve as a backing store to one or more caches such as the L2 cache 110, the L1 caches 111-114, or the LLC 115.

Some embodiments of the CPU 105 may implement a system management unit (SMU) 136 that may be used to carry out policies set by an operating system (OS) 138 of the CPU 105. For example, the SMU 136 may be used to manage thermal and power conditions in the CPU 105 according to policies set by the OS 138 and using information that may be provided to the SME 136 by the OS 138, such as power consumption by components of the CPU 105 or temperatures at different locations within the CPU 105. The SMU 136 may therefore be able to control power supplied to components such as the cores 106-109, as well as adjusting operating points of the cores 106-109, e.g., by changing an operating frequency or an operating voltage supplied to the cores 106-109. The SMU 136 may also be able to control power supplied to components on other power planes, such as the LLC 115, and may therefore adjust the operating frequency or operating voltage supplied to the LLC 115.

The components of the processing system 100 such as the CPU 105, the GPU 120, the cores 106-109, the L2 cache 110, or the LLC 115 are able to operate in different performance states, e.g., to conserve power. Exemplary performance states may include an active state, an idle state, a power-gated state, or other performance states in which the component may consume more or less power. Some embodiments of the SMU 136 determine whether to initiate transitions between the performance states by comparing the performance or power costs of the transition with the performance gains or power savings that may result from the transition. Transitions may occur from higher to lower performance states or from lower to higher performance states. For example, some embodiments of the processing system 100 include a power supply 131 that is connected to gate logic 132. The gate logic 132 can control the power supplied to the cores 106-109 and can gate the power provided to one or more of the cores 106-109, e.g., by opening one or more circuits to interrupt the flow of current to one or more of the cores 106-109 in response to signals or instructions provided by the SMU 136. The gate logic 132 can also re-apply power to transition one or more of the cores 106-109 out of the power-gated state to an idle state or an active state, e.g., by closing the appropriate circuits. Additional gate logic (not shown in FIG. 1) may be used to power gate other entities such as the LLC 115 or the GPU 120.

The SMU 136 may implement policy management logic 140 that can decide whether to power-gate components in the processing system based on measures of the dirtiness of caches associated with the components. For example, the policy management logic 140 may selectively power gate one or more of the processor cores 106-109 based on a measure of the dirtiness of the corresponding L1 caches 111-114. Dirtier caches may take longer to flush than less dirty caches and therefore may incur a larger cost in the event that they are flushed in preparation for power-gating. The policy management logic 140 may therefore preferentially power-gate processor cores 106-109 that are associated with less dirty L1 caches 111-114, e.g., L1 caches 111-114 that have a smaller number of dirty cache lines or a smaller fraction of cache lines that are dirty. Other entities may also be power gated based upon a measure of an associated cache dirtiness. For example, the LLC 115 may be power gated based upon its own cache dirtiness.

Some embodiments of the policy management logic 140 may selectively power gate components in the processing system based on cache dirtiness and a predicted duration of an idle state of one or more components of the processing system 100. The duration of the idle state may be predicted based on one or more previous durations of an idle state of the component. The predictions may be global, e.g., a single prediction can be used for all of the processor cores 106-109 based on previous durations of idle states for the processor cores 106-109, or they may be local, e.g., a duration of an idle state of the processor core 106 may be based only on previous durations of idle states for the processor core 106. The potential benefits of power-gating a component increase as the predicted idle time duration increases and so the policy management logic 140 may bias its power-gating decision in favor of power-gating components that have relatively long predicted idle time durations compared to other components that have the same level of cache dirtiness but have shorter predicted idle time durations.

Figure 2:
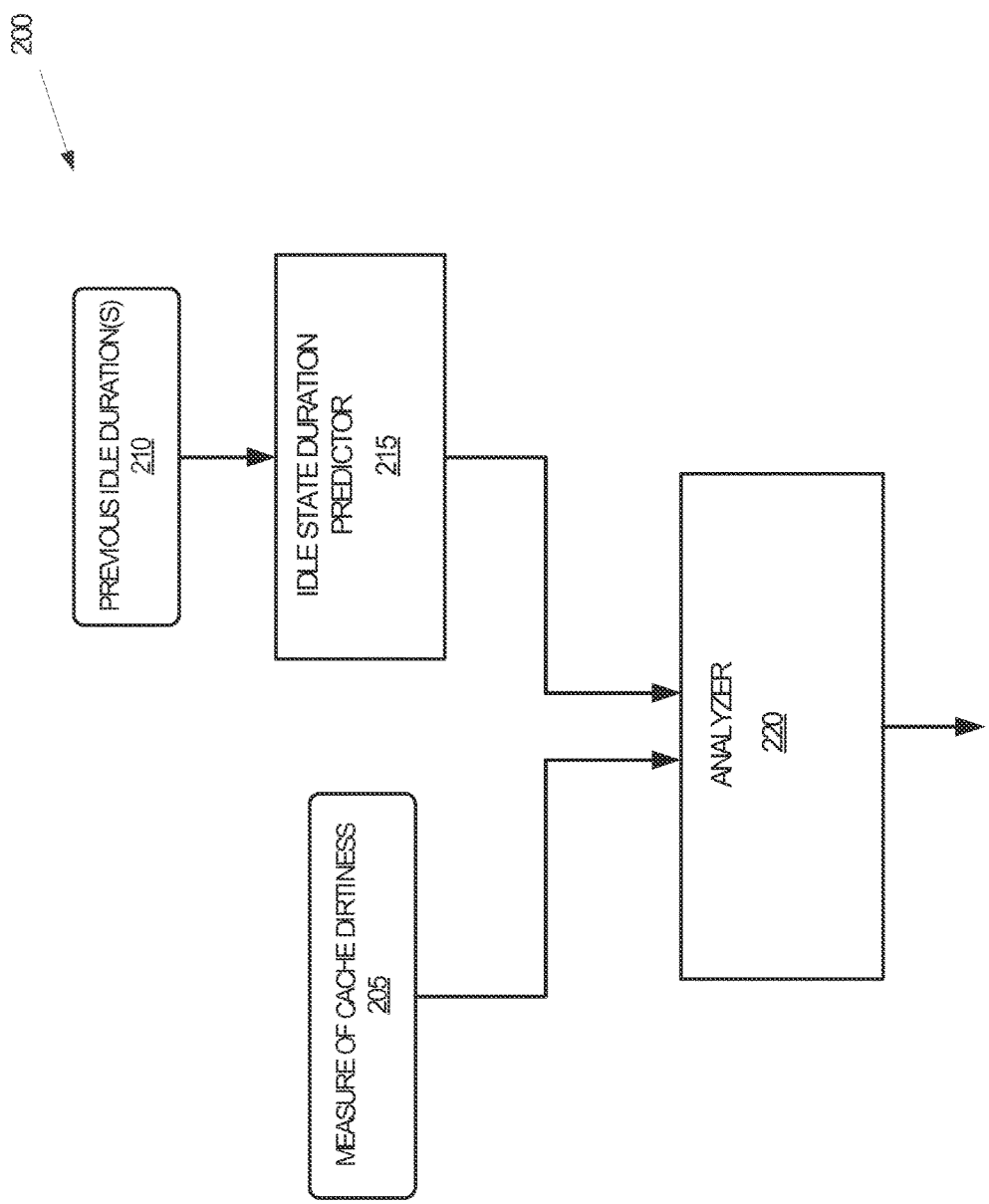
FIG. 2 is a block diagram of policy management logic of the processing system shown in FIG. 1 according to some embodiments.

FIG. 2 is a block diagram of policy management logic 200 that may be used as the policy management logic 140 shown in FIG. 1 according to some embodiments. The policy management logic 200 receives information 205 indicating values of measures of dirtiness of one or more caches such as the L2 cache 110, the L1 caches 111-114, or the LLC 115 shown in FIG. 1. The measures of cache dirtiness 205 may be direct measures such as a number of dirty cache lines in a cache or a fraction of the cache lines that are dirty. The direct measures may be calculated by the policy management logic 200 or they may be accessed from other locations such as a performance counter that indicates a number of dirty cache lines in the cache. The information 205 that indicates measures of cache dirtiness may also be indirect measures such as information that can be used to estimate a level of cache dirtiness. For example, indirect measures may include information accessed from a performance counter that tracks a number of cache lines in the cache whose status changes from states such as "read-only" or "exclusive" to states such as "dirty" or "modified" during a particular time interval. For another example, indirect measures may include one or more bits that indicate whether any of the cache lines in a group or sector of cache lines in the cache is dirty. For yet another example, indirect measures may include information indicating a number of opcodes in an instruction stream that are capable of making a cache line in the cache dirty.

Figure 3:
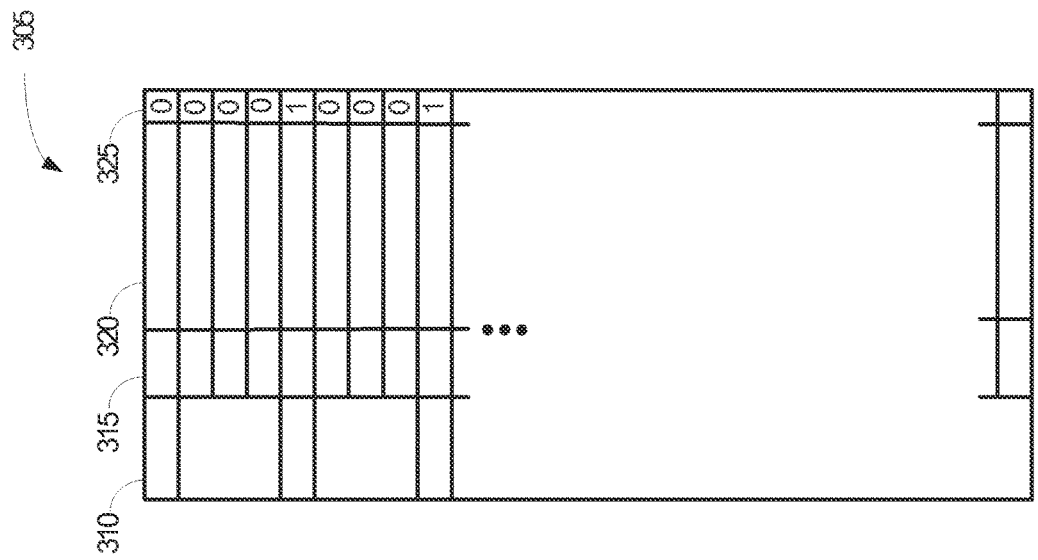
FIG. 3 is a diagram showing two caches that have different measures of cache dirtiness in accordance with some embodiments.
Figure 3:
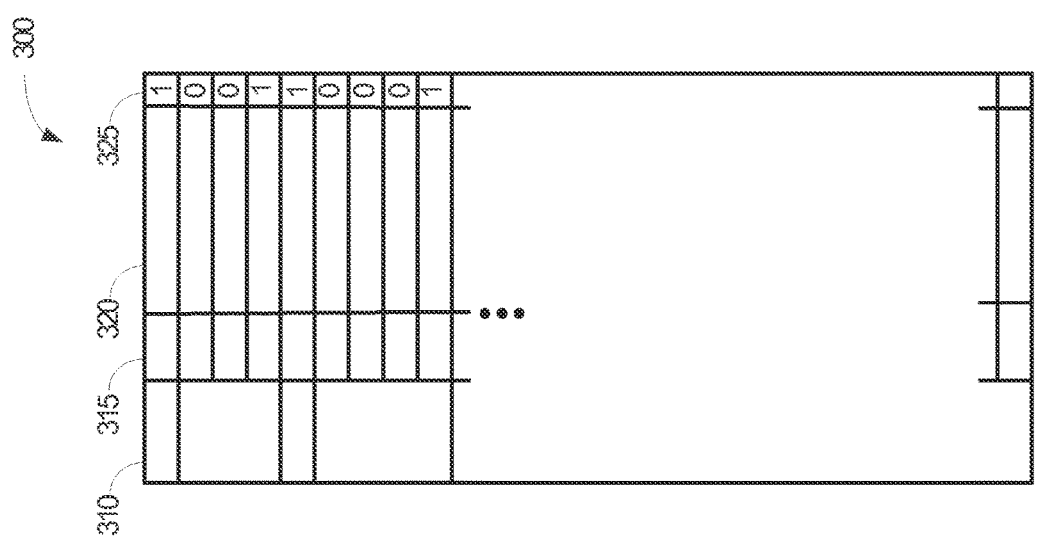

FIG. 3 is a diagram showing two caches 300, 305 that have different measures of cache dirtiness in accordance with some embodiments. The caches 300, 305 may be used to implement the L2 cache 110, the L1 caches 111-114, or the LLC 115 shown in FIG. 1. The caches 300, 305 include a column 310 that includes fields for storing information identifying an index of the cache line, a column 315 that includes fields for storing information identifying a way of the cache line, a column 320 that includes fields for storing a copy of the cached information, and a column of dirty bits 325 for storing values of dirty bits associated with the cache lines. Some embodiments of the caches 300, 305 may include other information such as one or more bits to indicate whether a group or sector of the cache 300, 305 includes one or more dirty cache lines. This information may be used instead of or in addition to the dirty bits stored in the column of dirty bits 325.

The dirtiness of the caches 300, 305 can be determined using the values of the dirty bits 325. Some embodiments of the caches 300, 305 may set a dirty bit 325 to 1 to indicate that the corresponding cache line is dirty and to zero to indicate that the corresponding cache line is clean or unmodified. For example, the dirtiness of the cache 300 may be larger than the dirtiness of the cache 305 because the number of dirty bits set to 1 is larger in the cache 300 than in the cache 305. The fraction of the dirty bits that are set to 1 is also larger in the cache 300 than in the cache 305. As discussed herein, other measures of the dirtiness of the caches 300, 305 may also be used. The number or fraction of cache lines that are dirty may be indicated by the number of cache lines whose status changes from another state to "dirty" or "modified." A performance counter implemented in the processing system 100 shown in FIG. 1 may therefore track these status changes in the cache lines in the caches 300, 305. The bits that indicate whether any of the cache lines in a group or sector of cache lines in the caches 300, 305 is dirty may also be used as an indicator of the dirtiness of the caches 300, 305. The relative dirtiness of the caches 300, 305 may be affected by a number of opcodes capable of making a cache line in the caches 300, 305 dirty and the number of this type of opcode may therefore be used as an indicator of cache dirtiness.

Referring back to FIG. 2, the policy management logic 200 may also receive information 210 indicating the durations of one or more previous idle states of one or more components of a processing system such as the processing system 100 shown in FIG. 1. As discussed herein, this information may be stored in a table or other data structure that may be updated in response to one or more components entering or leaving the idle state. An idle state duration predictor 215 may then use this information to predict a duration of an idle state of a component of the processing system. For example, the processing system may transition a processor core such as one of the processor cores 106-109 shown in FIG. 1 to an idle state if there are no process threads scheduled for execution on the processor core. The idle state duration predictor 215 may then predict the duration of the idle state, e.g., in response to a signal indicating that the processor core is going to transition to the idle state or in response to a signal indicating that the processor core is idle.

The idle state duration predictor 215 may predict durations of the idle states using one or more prediction techniques. Some embodiments of the idle state duration predictor 215 may use a last value predictor to predict durations of the idle states. For example, the idle state duration predictor 215 accesses a value of a duration of an idle state associated with a component in a processing device when a table that stores the previous durations is updated, e.g., in response to the reactivation of the idle component so that the total duration of the previous idle state can be measured by the last value predictor. The total duration of the idle state is the time that elapses between entering the idle state and transitioning to the active state or other performance state. The updated value of the duration is used to update an idle state duration history that includes a predetermined number of durations of previous idle states. For example, the idle state duration history, Y(t), may include information indicating the durations of the last ten idle states so that the training length of the last value predictor is ten. The training length is equal to the number of previous idle states used to predict the duration of the next idle state.

The idle state duration predictor 215 may then calculate an average of the durations of the idle states in the idle state history, e.g., using equation (1) for computing the average of the last ten idle states:

$$\overline{Y(t)} = \Sigma_{i=1}^{10} 0.1 * Y(t-i) \qquad (1)$$

Some embodiments of the idle state duration predictor 215 may also generate a measure of the prediction error that indicates the proportion of the signal that is well modeled by the last value predictor model. For example, the idle state duration predictor 215 may produce a measure of prediction error based on the training data set. Measures of the prediction error may include differences between the durations of the idle states in the idle state history and the average value of the durations of the idle states in the idle state history. The measure of the prediction error may be used as a confidence measure for the predicted duration of the idle state.

Some embodiments of the idle state duration predictor 215 may use a linear predictor to predict durations of the performance states. For example, the idle state duration predictor 215 may access measured value(s) of the duration of the previous idle state to update an idle state duration history that includes a predetermined number of previous idle state durations that corresponds to the training length of the linear predictor. For example, the idle state duration history, Y(t), may include information indicating the durations of the last N idle states so that the training length of the linear predictor is N. The idle state duration predictor 215 may compute a predetermined number of linear predictor coefficients a(i). The sequence of idle state durations may include different durations and the linear predictor coefficients a(i) may be used to define a model of the progression of idle state durations that can be used to predict the next idle state duration.

The idle state duration predictor 215 may compute a weighted average of the durations of the idle events in the idle event history using the linear predictor coefficients a(i), e.g., using equation (2) for computing the average of the last N idle events:

$$\overline{Y(t)} = \Sum_{i=1}^{N} a(i)*Y(t-i) \quad (2)$$

Some embodiments of the linear predictor algorithm may use different training lengths and/or numbers of linear predictor coefficients. Some embodiments of the idle state duration predictor 215 may also generate a measure of the prediction error that indicates the proportion of the signal that is well modeled by the linear predictor model, e.g., how well the linear predictor model would have predicted the durations in the idle state history. For example, the idle state duration predictor 215 may produce a measure of prediction error based on the training data set. The measure of the prediction error may be used as a confidence measure for the predicted idle state duration.

Some embodiments of the idle state duration predictor 215 may use a filtered linear predictor to predict durations of the idle states. For example, the idle state duration predictor 215 may filter an idle state duration history, Y(t), to remove outlier idle events such as events that are significantly longer or significantly shorter than the mean value of the idle state durations in the history. The idle state duration predictor 215 may then compute a predetermined number of linear predictor coefficients a(i) using the filtered idle event history. The idle state duration predictor 215 may also compute a weighted average of the durations of the idle events in the filtered idle event history using the linear predictor coefficients a(i), e.g., using equation (3) for computing the weighted average of the last N idle events in the filtered idle event history Y':

$$\overline{Y(t)} = \Sum_{i=1}^{N} a(i)*Y'(t-i) \quad (3)$$

Some embodiments of the filtered linear predictor algorithm may use different filters, training lengths, and/or numbers of linear predictor coefficients. Some embodiments of the idle state duration predictor 215 may also generate a measure of the prediction error that indicates the proportion of the signal that is well modeled by the filtered linear predictor model. The measure of the prediction error may be used as a confidence measure for the predicted idle state duration.

Figure 4:
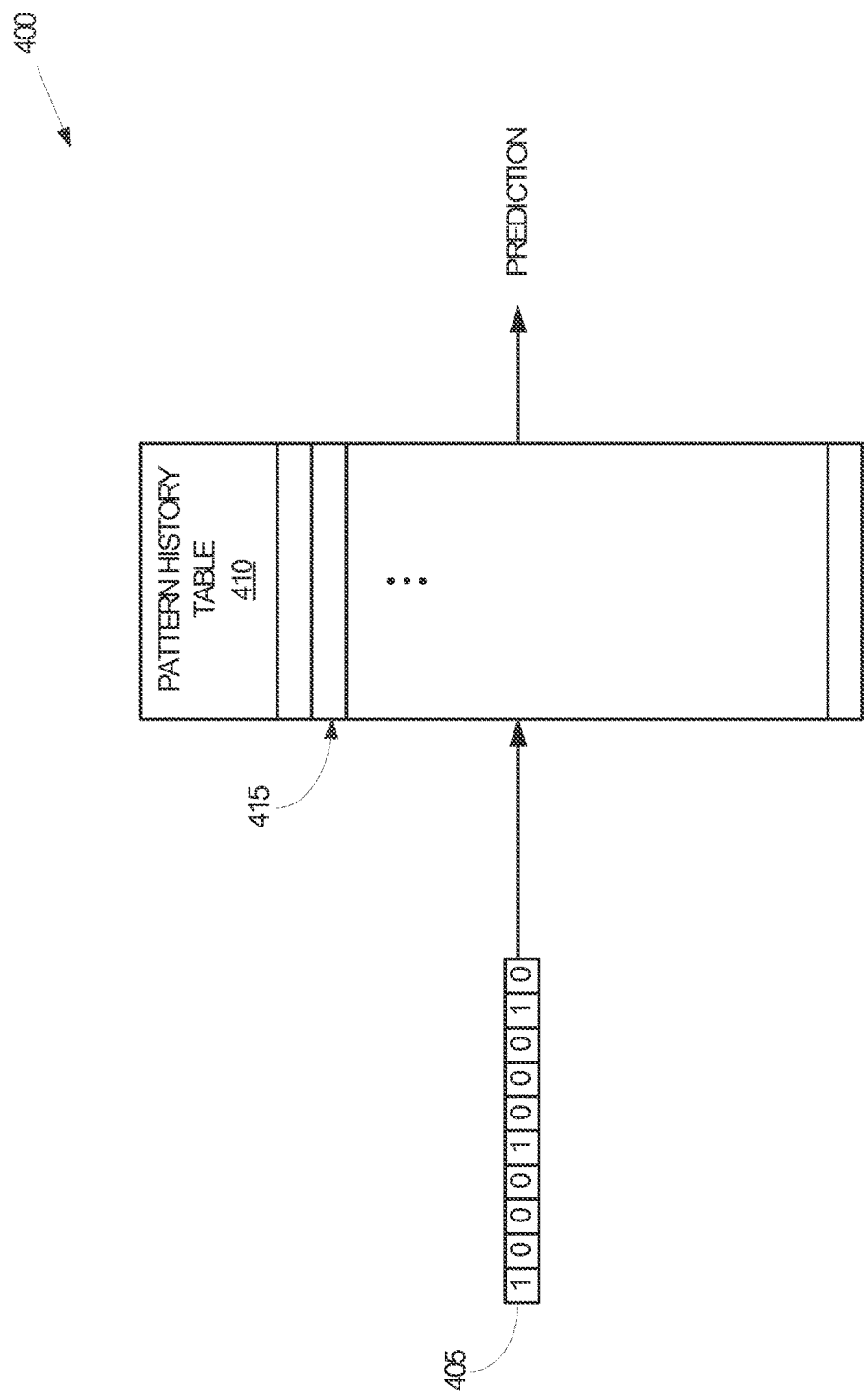
FIG. 4 is a diagram of a two-level adaptive global predictor that may be used by the policy management logic shown in FIG. 2 in accordance with some embodiments.

FIG. 4 is a diagram of a two-level adaptive global predictor 400 that may be used by the idle state duration predictor 215 shown in FIG. 2 in accordance with some embodiments. The two levels used by the global predictor 400 correspond to long and short durations of a performance state. For example, a value of "1" may be used to indicate an idle state that has a duration that is longer than a threshold and a value of "0" may be used to indicate an idle state that has a duration that is shorter than the threshold. The threshold may be set based on one or more performance policies, as discussed herein. The global predictor 400 receives information indicating the duration of idle states and uses this information to construct a pattern history 405 for long or short duration events. The pattern history 405 includes information for a predetermined number N of idle states, such as the ten idle states shown in FIG. 4.

A pattern history table 410 includes $2^N$ entries 415 that correspond to each possible combination of long and short durations in the N idle states. Each entry 415 in the pattern history table 410 is also associated with a saturating counter that can be incremented or decremented based on the values in the pattern history 405. An entry 415 may be incremented when the pattern associated with the entry 415 is received in the pattern history 405 and is followed by a long-duration idle state. The saturating counter can be incremented until the saturating counter saturates at a maximum value (e.g., all "1s") that indicates that the current pattern history 405 is very likely to be followed by a long duration idle state. An entry 415 may be decremented when the pattern associated with the entry 415 is received in the pattern history 405 and is followed by a short-duration idle state. The saturating counter can be decremented until the saturating counter saturates at a minimum value (e.g., all "0s") that indicates that the current pattern history 405 is very likely to be followed by a short duration idle state.

The two-level global predictor 400 may predict that an idle state is likely to be a long-duration event when the saturating counter in an entry 415 that matches the pattern history 405 has a relatively high value of the saturating counter such as a value that is close to the maximum value. The two-level global predictor 400 may predict that an idle state is likely to be a short-duration event when the saturating counter in an entry 415 that matches the pattern history 405 has a relatively low value of the saturating counter such as a value that is close to the minimum value.

Some embodiments of the two-level global predictor 400 may also provide a confidence measure that indicates a degree of confidence in the current prediction. For example, a confidence measure can be derived by counting the number of entries 415 that are close to being saturated (e.g., are close to the maximum value of all "1s" or the minimum value of all "0s") and comparing this to the number of entries that do not represent a strong bias to long or short duration idle states (e.g., values that are approximately centered between the maximum value of all "1s" and the minimum value of all "0s"). If the ratio of saturated to unsaturated entries 415 is relatively large, the confidence measure indicates a relatively high degree of confidence in the current prediction and if this ratio is relatively small, the confidence measure indicates a relatively low degree of confidence in the current prediction.

Figure 5:
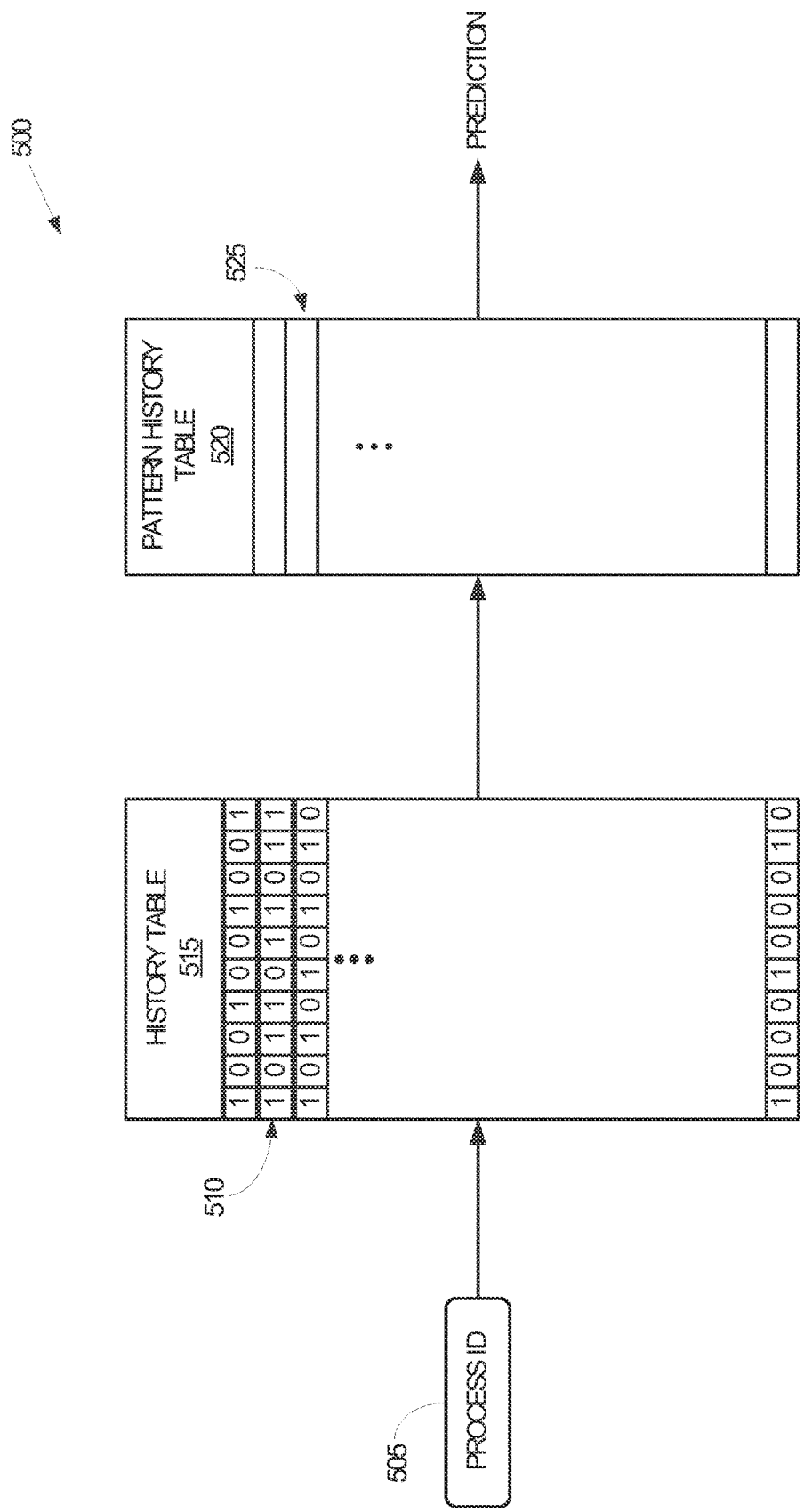
FIG. 5 is a diagram of a two-level adaptive local predictor that may be used by the policy management logic shown in FIG. 2 in accordance with some embodiments.

FIG. 5 is a diagram of a two-level local predictor 500 that may be used by the idle state duration predictor 215 shown in FIG. 2 in accordance with some embodiments. As discussed herein, the two levels used by the two-level adaptive local predictor 500 correspond to long and short durations of a corresponding performance state. The two-level local predictor 500 receives a process identifier 505 that can be used to identify a pattern history entry 510 in a history table 515. Each pattern history entry 510 is associated with a process and includes a history that indicates whether previous performance state durations associated with the corresponding process were long or short. In some embodiments, the threshold that divides long durations from short durations may be set based on performance policies, as discussed herein.

A pattern history table 520 includes $2^N$ entries 525 that correspond to each possible combination of long and short durations in the N performance states in each of the entries 510. Some embodiments of the two-level local predictor 500 may include a separate pattern history table 520 for each process. Each entry 525 in the pattern history table 520 is also associated with a saturating counter. As discussed herein, the entries 525 may be incremented or decremented when the pattern associated with the entry 525 matches the pattern in the entry 510 associated with the process identifier 505 and is followed by a long-duration event or a short-duration performance state, respectively.

The two-level local predictor 500 may then predict that a performance state is likely to be a long-duration event when the saturating counter in an entry 525 that matches the pattern in the entry 510 associated with the process identifier 505 has a relatively high value of the saturating counter such as a value that is close to the maximum value. The two-level local predictor 500 may predict that a performance state is likely to be a short-duration performance state when the saturating counter in an entry 525 that matches the pattern in the entry 510 associated with the process identifier 505 has a relatively low value of the saturating counter such as a value that is close to the minimum value.

Some embodiments of the two-level local predictor 500 may also provide a confidence measure that indicates a degree of confidence in the current prediction. For example, a confidence measure can be derived by counting the number of entries 525 that are close to being saturated (e.g., are close to the maximum value of all "1s" or the minimum value of all "0s") and comparing this to the number of entries 525 that do not represent a strong bias to long or short duration performance states (e.g., values that are approximately centered between the maximum value of all "1s" and the minimum value of all "0s"). If the ratio of saturated to unsaturated entries 525 is relatively large, the confidence measure indicates a relatively high degree of confidence in the current prediction and if this ratio is relatively small, the confidence measure indicates a relatively low degree of confidence in the current prediction.

Figure 6:
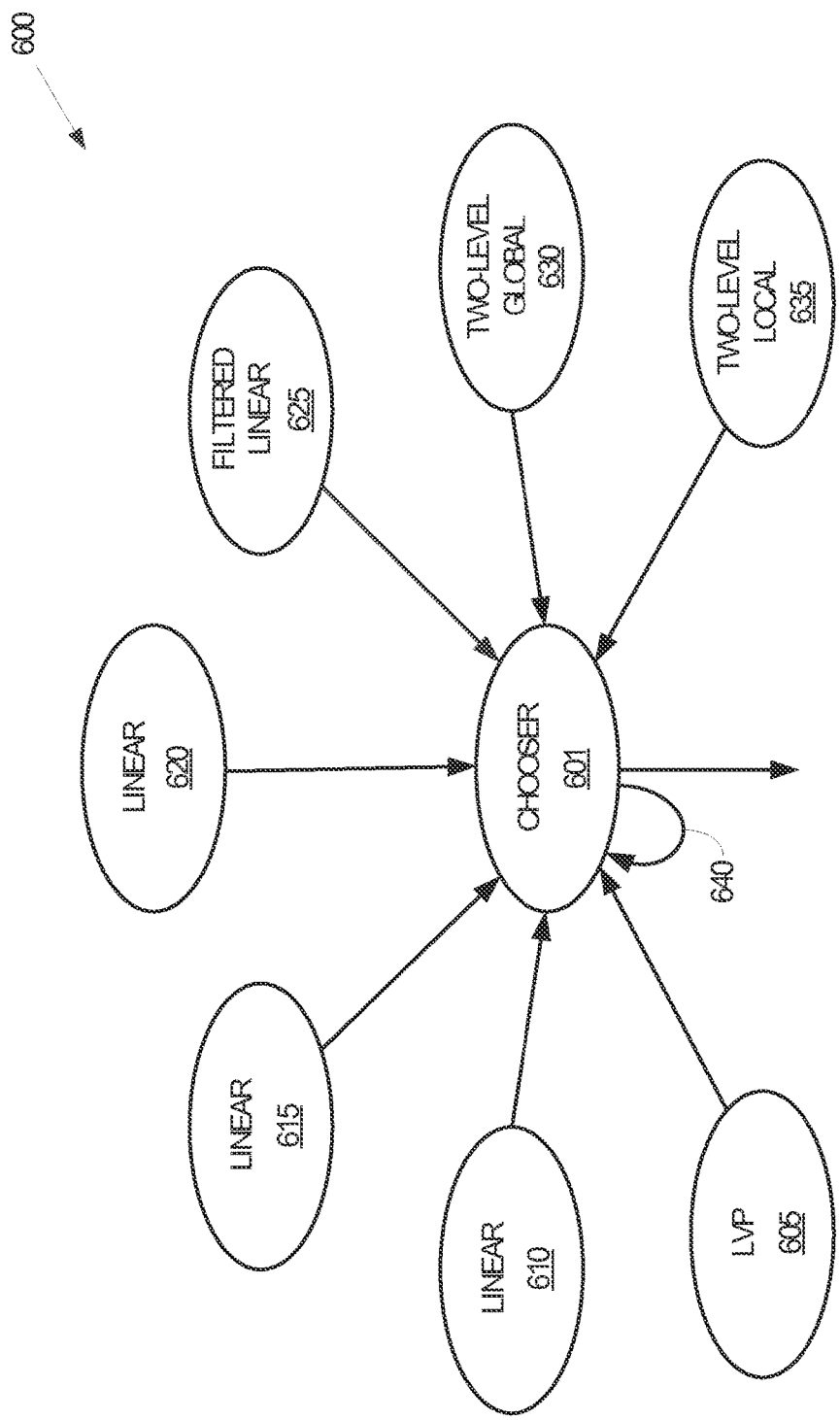
FIG. 6 is a block diagram of a tournament predictor that may be implemented in the policy management logic shown in FIG. 2 in accordance with some embodiments.

FIG. 6 is a block diagram of a tournament predictor 600 that may be implemented in the idle state duration predictor 215 shown in FIG. 2 in accordance with some embodiments. The tournament predictor 600 includes a chooser 601 that is used to select one of a plurality of predictions of a duration of a performance state provided by a plurality of different prediction algorithms, such as a last value predictor 605, a first linear prediction algorithm 610 that uses a first training length and a first set of linear coefficients, a second linear prediction algorithm 615 that uses a second training length and a second set of linear coefficients, a third linear prediction algorithm 620 that uses a third training length and a third set of linear coefficients, a filtered linear prediction algorithm 625 that uses a fourth training length and a fourth set of linear coefficients, a two-level global predictor 630, and a two-level local predictor 635. However, selection of algorithms shown in FIG. 6 is intended to be exemplary and some embodiments may include more or fewer algorithms of the same or different types.

Referring back to FIG. 2, the policy management logic 200 includes an analyzer 220 that can implement performance policies such as policies set by the OS 138 shown in FIG. 1. Some embodiments of the analyzer 220 may selectively power gate components in the processing system based on cache dirtiness. Some embodiments of the analyzer 220 may also base the power-gating decision on a predicted duration of an idle state of one or more components of the processing system. For example, the analyzer 220 may estimate the time to flush a dirty cache associated with the component because flushing the cache contributes to the overhead of power gating entry. The analyzer 220 may also estimate the performance impact of losing cache state because of the power gating entry on thread execution once the component is brought out of power gating.

Figure 7:
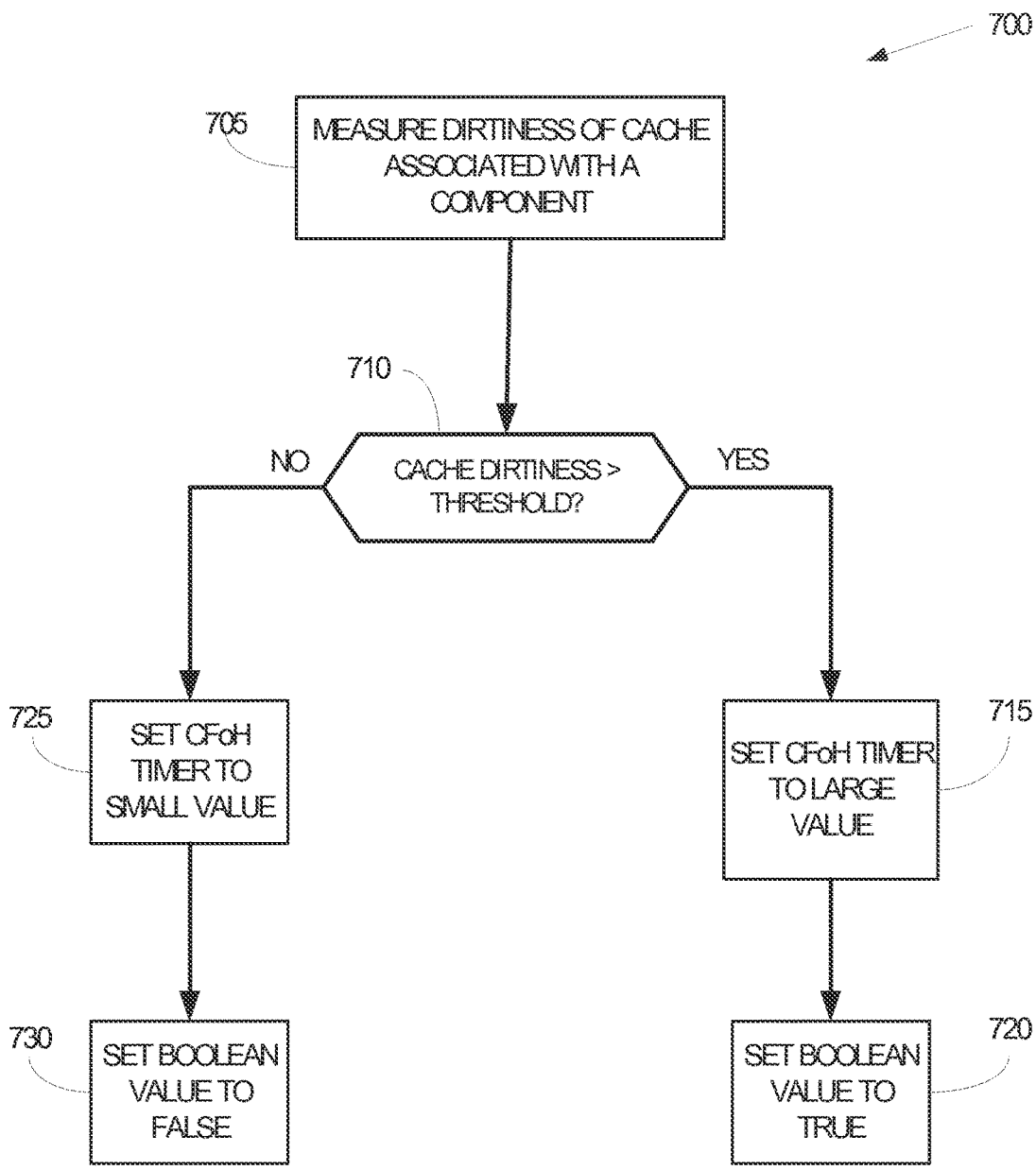
FIG. 7 is a flow diagram of a method for setting power-gating policies based on a cache dirtiness in accordance with some embodiments.
Figure 8:
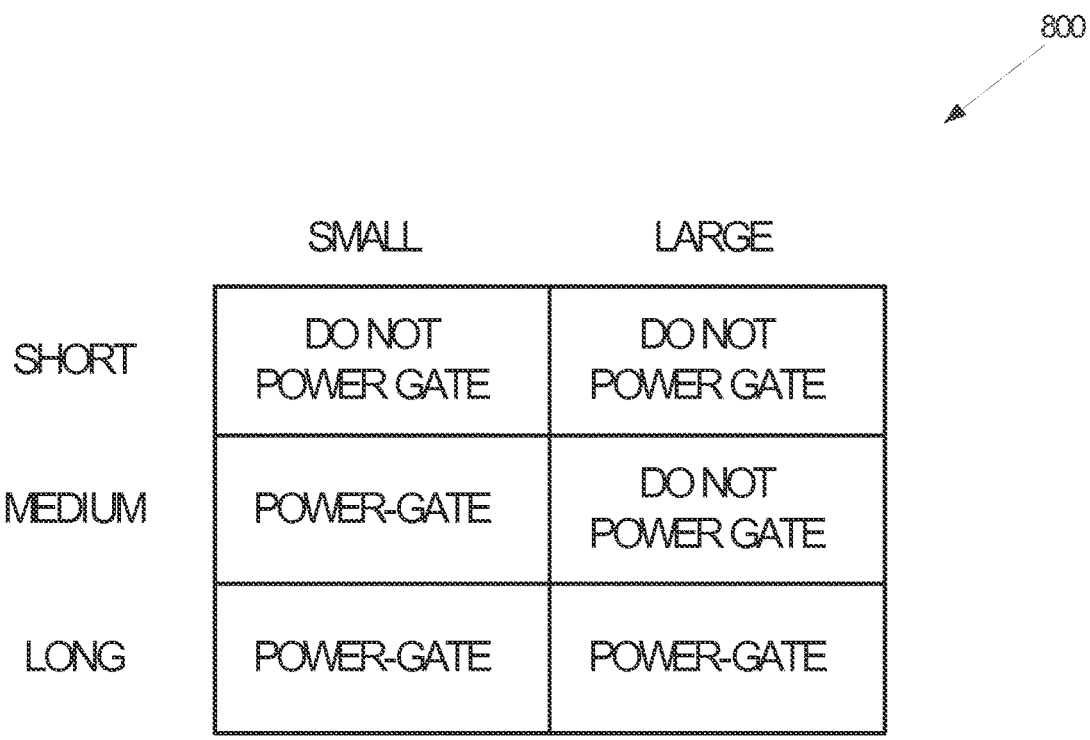
FIG. 8 is a diagram that represents a policy for power-gating a component of a processing system based on a cache dirtiness and a predicted idle time duration in accordance with some embodiments.
Figure 9:
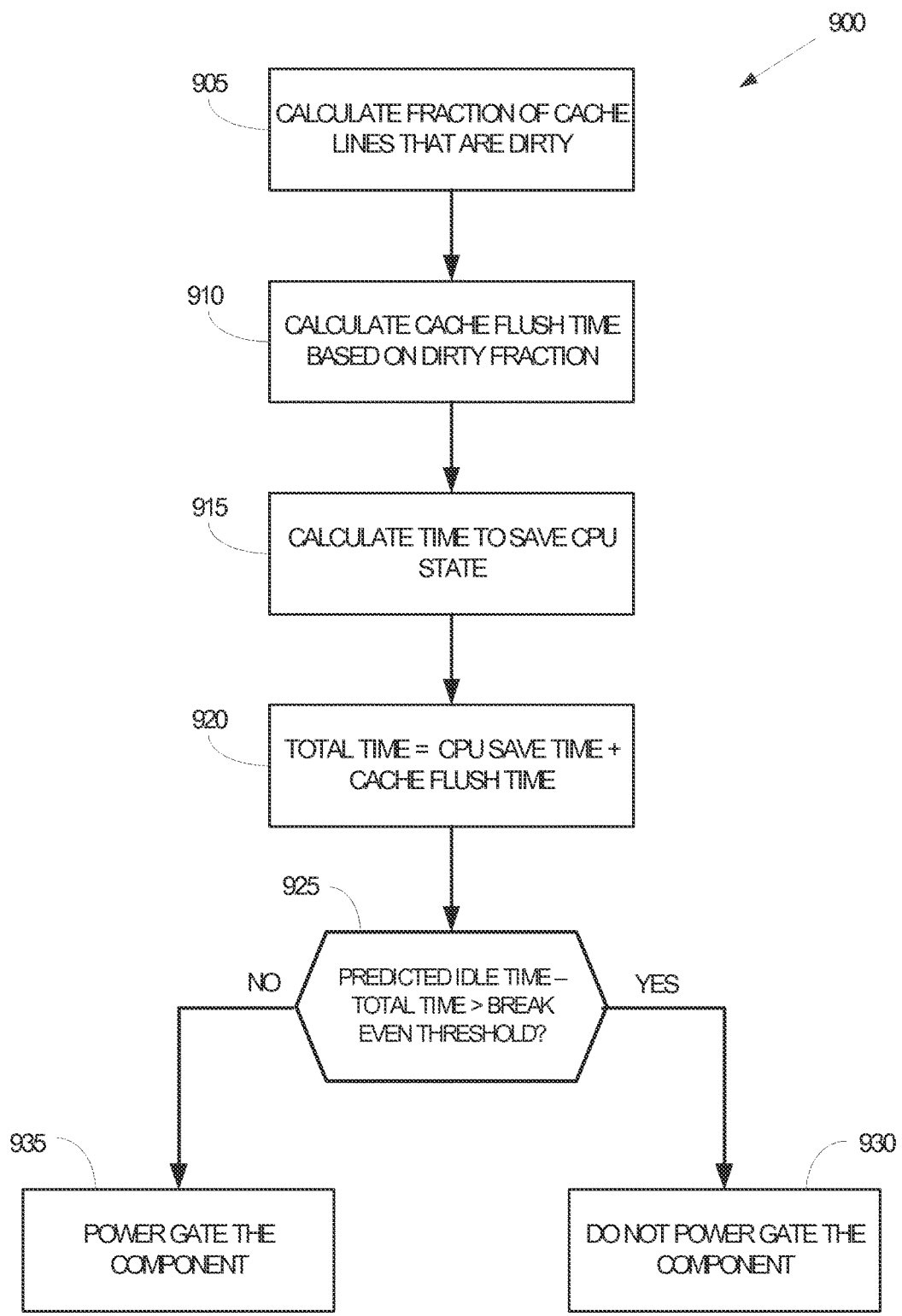
FIG. 9 is a flow diagram of a method for deciding whether to power gate a component of processor of the processing system shown in FIG. 1 according to some embodiments.

The analyzer 220 may then utilize some or all of the above mentioned information to decide whether the costs of entering the power gated state exceed the benefits so that the analyzer 220 can selectively power gate components when the benefits exceed the costs. For example, as shown in FIG. 7, the performance policy may indicate that power gating decisions should be biased in favor of power gating components when a cache dirtiness associated with the component is less than a threshold value, which may indicate that the performance or latency cost associated with flushing the cache is relatively low. For another example, as shown in FIG. 8, the performance policy may be represented as a table indicating whether different combinations of the measured cache dirtiness and the predicted duration of the idle state of a component indicate that the component should or should not be power gated. For yet another example, as shown in FIG. 9, the performance policy may indicate that a component should be power gated when the difference between a predicted idle time and the time required to flush the cache and save a state of the component exceeds a breakeven threshold time at which the benefits of power gating the component are expected to exceed the costs.

FIG. 7 is a flow diagram of a method 700 for setting power-gating policies based on a cache dirtiness in accordance with some embodiments. At block 705, an analyzer such as the analyzer 220 shown in FIG. 2 measures or accesses measurements of a dirtiness of one or more caches associated with a component in the processing system. Some embodiments of the analyzer may measure, calculate, or estimate the dirtiness of one or more of the caches in response to the component entering an idle state or an indication that the component is going to enter an idle state. The cache dirtiness (or other parameter determined from a cache dirtiness or representative of a cache dirtiness) is compared to a threshold at decision block 710. The threshold may be determined by comparing the costs and benefits of power gating the component. Some embodiments of the threshold may be predetermined values that may be defined based on theoretical predictions, empirical predictions, modeling, or other techniques.

The costs of power-gating the component may exceed the benefits if the cache dirtiness is larger than the threshold. The power-gating decision may therefore be biased against power-gating the component. Some embodiments of the analyzer may bias the decision by setting a timer, such as a cache-flush-on-hold (CFoH) timer, which indicates the amount of time the component should spend in the idle state before the component is power gated and its associated caches are flushed, to a relatively large value at block 715. Setting the timer to a relatively large value makes it less likely that the component will be power gated in response to entering the idle state. The analyzer may also set a Boolean value to TRUE at block 720 to indicate that power gating of the component should be blocked or prevented. Blocks 715, 720 are not necessarily implemented in all embodiments and some embodiments may one or the other, or both.

The benefits of power-gating the component may exceed the costs if the cache dirtiness is less than the threshold. The analyzer may therefore bias the power-gating decision in favor of power-gating the component. Some embodiments of the analyzer may bias the decision by setting a timer, such as the cache-flush-on-hold (CFoH) timer, to a relatively small value at block 725. Setting the timer to a relatively small value makes it more likely that the component will be power gated in response to entering the idle state. The analyzer may also set a Boolean value to FALSE at block 730 to indicate that power gating of the component should not be blocked or prevented. Blocks 725, 730 are not necessarily implemented in all embodiments and some embodiments may one or the other, or both.

FIG. 8 is a diagram that represents a policy 800 for power-gating a component of a processing system based on a cache dirtiness and a predicted idle time duration in accordance with some embodiments. The vertical axis of the policy 800 indicates different categories of the predicted idle time duration, e.g., the idle time duration predicted in response to the component entering the idle state or an indication that the component is going to enter the idle state. For example, the SHORT category may be applied if the predicted idle time duration for the component is shorter than a first time interval, the MEDIUM category may be applied if the predicted idle time duration is longer than the first time interval and shorter than a second time interval, and the LONG category may be applied if the predicted idle time duration is longer than the second time interval. The horizontal axis of the policy 800 indicates different categories of the cache dirtiness. For example, the cache dirtiness may be associated with the SMALL category if the number or percentage of dirty cache lines is less than a selected number or percentage and the cache dirtiness may be associated with the LARGE category if the number or percentage of dirty cache lines is greater than the selected number or percentage.

The policy 800 indicates whether or not the component should be power-gated based on the idle time duration category and the cache dirtiness category. The decision is biased in favor of power gating the component when the cache dirtiness category is SMALL. For example, the component is power gated if the idle time duration category is SHORT and the component is not power-gated if the idle time duration category is LONG, regardless of the cache dirtiness. However, if the idle time duration category is MEDIUM, then the component is power gated if the cache dirtiness category is SMALL and is not power gated if the cache dirtiness category is LARGE.

FIG. 9 is a flow diagram of a method 900 for selectively power gating a component of a CPU such as the CPU 105 shown in FIG. 1 according to some embodiments. Although the method 900 is described in the context of a CPU, some embodiments of the method 900 may be used to decide whether to power-gate other components such as GPUs, APUs, or cores within these components. Embodiments of the method 900 may be implemented in an analyzer such as the analyzer 220 shown in FIG. 2.

At block 905, the analyzer calculates the fraction of dirty lines in one or more caches associated with the component of the processor system. At block 910, the analyzer calculates the cache flush time based on the fraction of dirty lines. Some embodiments of the analyzer may use the fraction of dirty lines in the cache(s) to estimate the total amount of information that needs to be written back to the appropriate backing store such as the DRAM 130 shown in FIG. 1. The analyzer may also estimate the available bandwidth for writing information to the backing store such as the DRAM. The cache flush time is then approximately given by dividing the total amount of information by the available bandwidth. At block 915, the analyzer calculates the time required to save the CPU state information, e.g., by dividing the amount of information to save by the available bandwidth. At block 920, the analyzer calculates a total time as the sum of the cache flush time and CPU state save time.

The total time may then be compared to a predicted idle time for the component and a breakeven threshold time at decision block 925. Some embodiments may define the breakeven threshold time as the minimum duration of an idle state needed to completely amortize the energy costs of transitioning into the power-gated state. The cost of power gating the component may exceed the expected benefits if a difference between the predicted idle time and the total time is greater than the breakeven threshold. The analyzer may therefore not power gate the component at block 930. The expected benefits of power gating the component may exceed the cost of power gating the component if the difference is less than the breakeven threshold. The analyzer may therefore power gate the component at block 935.

Instead of explicitly power gating the component (or not), some embodiments of the analyzer may bias the power-gating decision based on whether the difference between the predicted idle time and the total time is greater than or less than the breakeven threshold. For example, the analyzer may bias the power-gating decision in favor of power-gating the component when the difference is greater than the breakeven threshold by setting a timer, such as the CFoH timer, to a relatively small value. Conversely, the timer may be set to a relatively large value when the difference is less than the breakeven threshold. For another example, the analyzer may set a Boolean value to FALSE to indicate that power gating of the component should not be blocked or prevented when the difference is greater than the breakeven threshold. Conversely, a Boolean value may be set to TRUE to indicate that power gating of the component should be blocked or prevented when the difference is less than the breakeven threshold.

Embodiments of the techniques described herein allow processing systems to make effective power gating decisions. Better power gating decisions may save power and reduce performance overheads of power gating. Since the amount of dirtiness has performance implications at power gating entry and after power gating exit, embodiments that selectively power gate components based on cache dirtiness can help improve energy efficiency and reduce power gating overheads.

In some embodiments, the apparatus and techniques described above are implemented in a system comprising one or more integrated circuit (IC) devices (also referred to as integrated circuit packages or microchips), such as the policy management logic described above with reference to FIGS. 1-9. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 10:
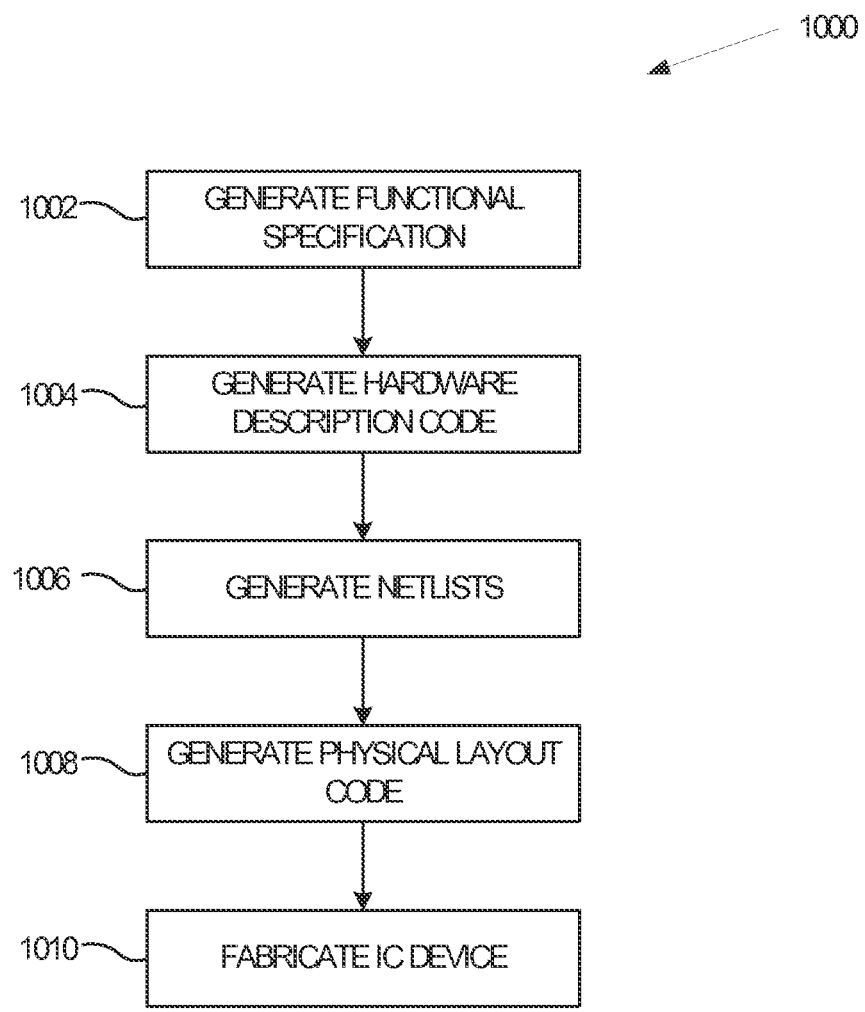
FIG. 10 is a flow diagram illustrating a method for designing and fabricating an integrated circuit device implementing at least a portion of a component of a processing system in accordance with some embodiments.

FIG. 10 is a flow diagram illustrating an example method 1000 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 1002 a functional specification for the IC device is generated. The functional specification (often referred to as a micro architecture specification (MAS)) may be represented by any of a variety of programming languages or modeling languages, including C, C++, SystemC, Simulink, or MATLAB.

At block 1004, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1006 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1008, one or more EDA tools use the netlists produced at block 1006 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1010, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   estimating a time to flush at least one cache that is used to cache data for access by a processor core of a processor system based on a cache dirtiness of the at least one cache,
   wherein estimating the time to flush the at least one cache comprises estimating a total amount of information that needs to be written back to a backing store based on the cache dirtiness and estimating available bandwidth for writing information to the backing store; and
   selectively power gating the processor core based on a sum of time to flush said at least one cache and a time to save a state of the processor core.

2. The method of claim 1, comprising:
   determining the cache dirtiness using at least one of: a performance counter that indicates a number of dirty cache lines in said at least one cache; a performance counter that tracks a number of cache lines in said at least one cache that change status to a dirty status; one or more bits that indicate whether any cache lines in a group or sector of cache lines in said at least one cache is dirty; and information indicating a number of opcodes capable of making a cache line in said at least one cache dirty.

3. The method of claim 1, wherein selectively power gating the processor core comprises power gating the processor core in response to the cache dirtiness exceeding a threshold and maintaining the processor core in an idle state in response to the cache dirtiness not exceeding the threshold.

4. The method of claim 1, comprising predicting a duration of an idle time of the processor core, and wherein selectively power gating the processor core comprises selectively power gating the processor core based on the cache dirtiness and the predicted idle time.

5. The method of claim 4, wherein the processor core is associated with one of a plurality of categories of predicted idle time duration and one of a plurality of categories of cache dirtiness, and wherein deciding whether to power gate the processor core comprises deciding whether to power gate the processor core based on said one of the plurality of categories of predicted idle time duration and said one of the plurality of categories of cache dirtiness.

6. The method of claim 1, wherein selectively power gating the processor core comprises power gating the processor core when a difference between the predicted duration of an idle time and the sum is greater than a breakeven threshold time at which benefits of power gating the processor core are equal to costs of power gating the processor core.

7. The method of claim 1, wherein deciding whether to power gate the processor core comprises setting a timer that indicates a time that elapses before an idle processor core is power gated to a first value in response to the cache dirtiness being above a threshold and setting the timer to a second value in response to the cache dirtiness being below the threshold, the second value greater than the first value.

8. The method of claim 1, wherein deciding whether to power gate the processor core comprises setting a Boolean value that prevents power gating to TRUE in response to the cache dirtiness being above a threshold and setting the Boolean value to FALSE in response to the cache dirtiness being below the threshold.

9. The method of claim 1, wherein estimating the time to flush the at least one cache comprises dividing the total amount of information by the available bandwidth.

10. The method of claim 9, further comprising:
    estimating the time to save the state of the processor core based on the available bandwidth.

11. A processor system comprising:
    a processor core;
    at least one cache to cache data for access by the processor core;
    analyzer logic to estimate a time to flush the at least one cache based on a cache dirtiness of the at least one cache, wherein the analyzer logic is configured to selectively power gate the processor core based on a sum of the time to flush said at least one cache and a time to save a state of the processor core; and
    a backing store to store information flushed from the at least one cache, wherein the analyzer logic is configured to estimate a total amount of information that needs to be written back to the backing store based on the cache dirtiness and estimate available bandwidth for writing information to the backing store.

12. The processor system of claim 11, comprising at least one of a performance counter and storage for at least one bit, and wherein the analyzer logic decides whether to power gate the processor core based on at least one of: a value of the performance counter that indicates a number of dirty cache lines in said at least one cache; a value of the performance counter that tracks a number of cache lines in said at least one cache whose status changes to a dirty status; values of one or more bits that indicate whether any cache lines in a group or sector of cache lines in said at least one cache is dirty; and information indicating a number of opcodes capable of making a cache line in said at least one cache dirty.

13. The processor system of claim 11, wherein the analyzer logic power gates the processor core when the cache dirtiness exceeds a threshold and maintains the processor core in an idle state when the cache dirtiness does not exceed the threshold.

14. The processor system of claim 11, comprising idle time prediction logic to predict a duration of an idle time of the processor core, and wherein the analyzer logic selectively power gates the processor core based on the cache dirtiness and the predicted duration of the idle time.

15. The processor system of claim 14, wherein the analyzer logic associates the processor core with one of a plurality of categories of predicted idle time duration and one of a plurality of categories of cache dirtiness, and wherein the analyzer logic selectively power gates the processor core based on said one of the plurality of categories of predicted idle time duration and said one of the plurality of categories of cache dirtiness.

16. The processor system of claim 11, wherein the analyzer logic selectively power gates the processor core when a difference between the predicted idle time and the sum is greater than a breakeven threshold time at which benefits of power gating the processor core are equal to costs of power gating the processor core.

17. The processor system of claim 11, wherein the analyzer logic sets a timer that indicates a time that elapses before an idle processor core is power gated to a first value in response to the cache dirtiness being above a threshold, and wherein the analyzer logic sets the timer to a second value in response to the cache dirtiness being below the threshold, wherein the first value is smaller than the second value.

18. The processor system of claim 11, wherein the analyzer logic sets a Boolean value that prevents power gating to TRUE in response to the cache dirtiness being above a threshold, and wherein the analyzer logic sets the Boolean value to FALSE in response to the cache dirtiness being below the threshold.

19. The processor system of claim 11, wherein the analyzer logic is configured to divide the total amount of information by the available bandwidth to estimate the time to flush the at least one cache.

20. The processor system of claim 19, wherein the analyzer logic is configured to estimate the time to save the state of the processor core based on the available bandwidth.

21. A non-transitory computer readable storage medium embodying a set of executable instructions, the set of executable instructions to manipulate at least one processor to:
    estimate a time to flush at least one cache that is used to cache data for access by a processor core of a processor system based on a cache dirtiness of the at least one cache, wherein estimating the time to flush the at least one cache comprises estimating a total amount of information that needs to be written back to a backing store based on the cache dirtiness and estimating available bandwidth for writing information to the backing store; and
    selectively power gate a processor core of a processor system based on a sum of the time to flush said at least one cache and a time to save a state of the processor core.

22. The non-transitory computer readable storage medium of claim 21, wherein the set of executable instructions is to manipulate said at least one processor to decide whether to power gate the processor core based on the cache dirtiness and a predicted duration of an idle time of the processor core.

* * * * *